(12) United States Patent
Brion (10) Patent No.: US 10,906,254 B2
(45) Date of Patent: Feb. 2, 2021

(54) PROCESS AND DEVICE FOR MANUFACTURING A COMPOSITE PART ENABLING THE EVACUATION OF GAS FROM THE COMPOSITE PART

(71) Applicant: RATIER FIGEAC, Figeac (FR)

(72) Inventor: Patrice Brion, Lunan (FR)

(73) Assignee: RATIER FIGEAC, Figeac (FR)

( * ) Notice: Subject to any disclaimer, the term of this patent is extended or adjusted under 35 U.S.C. 154(b) by 278 days.

(21) Appl. No.: 16/065,191

(22) PCT Filed: Dec. 21, 2016

(86) PCT No.: PCT/EP2016/082187
§ 371 (c)(1),
(2) Date: Jun. 22, 2018

(87) PCT Pub. No.: WO2017/108953
PCT Pub. Date: Jun. 29, 2017

(65) Prior Publication Data
US 2019/0283344 A1 Sep. 19, 2019

(30) Foreign Application Priority Data

Dec. 24, 2015 (FR) ..................................... 15 63305

(51) Int. Cl.
*B29C 70/44* (2006.01)
*B29C 33/40* (2006.01)
(Continued)

(52) U.S. Cl.
CPC ............ *B29C 70/44* (2013.01); *B29C 33/405* (2013.01); *B29C 37/0064* (2013.01); *B29C 43/3642* (2013.01); *B29C 2043/3649* (2013.01)

(58) Field of Classification Search
CPC . B29C 33/405; B29C 37/006; B29C 37/0064; B29C 43/12; B29C 43/3642; B29C 2043/3649
See application file for complete search history.

(56) References Cited

U.S. PATENT DOCUMENTS 3,128,322 A 4/1964 Young
6,071,460 A * 6/2000 Renaudin .............. B29C 70/446
264/257
(Continued)

FOREIGN PATENT DOCUMENTS

| CN | 1163185 | 10/1997 |
| CN | 103963316 | 8/2014 |
| EP | 2 762 297 | 8/2014 |

OTHER PUBLICATIONS

International Search Report, PCT/EP2016/082187, dated Apr. 18, 2017.
(Continued)

*Primary Examiner* — Xiao S Zhoa
*Assistant Examiner* — John J DeRusso
(74) *Attorney, Agent, or Firm* — Ipsilson USA, LLP (57) ABSTRACT

Disclosed is a process for manufacturing a part, named composite part, formed from at least one composite material including at least one layer of a reinforcing structure impregnated with a polymer matrix within which the reinforcing structure extends, wherein: a composite blank of the composite part is prepared; and a step of curing the polymer matrix of the composite blank is carried out, exerting a pressure on at least one pressed face of the composite blank. The pressure is exerted in the form of a pressure gradient applied to the pressed face of the composite blank so as to cause the gas present within the composite part to flow from
(Continued)

a zone of maximum pressurization to a gas evacuation zone. Also disclosed is a device for manufacturing such a part.

16 Claims, 4 Drawing Sheets

(51) Int. Cl.
*B29C 43/36* (2006.01)
*B29C 37/00* (2006.01)

(56) References Cited

U.S. PATENT DOCUMENTS

| | | |
|---|---|---|
| 9,815,245 B2 | 11/2017 | Grove-Nielsen |
| 2014/0217651 A1 | 8/2014 | Grove-Nielsen |
| 2016/0200015 A1* | 7/2016 | Barlag .................. B29C 43/58 425/112 |
| 2018/0050503 A1 | 2/2018 | Grove-Nielsen |

OTHER PUBLICATIONS

Written Opinion, PCT/EP2016/082187, dated Apr. 18, 2017.
Chinese Office Action dated Oct. 31, 2019.

\* cited by examiner

PROCESS AND DEVICE FOR MANUFACTURING A COMPOSITE PART ENABLING THE EVACUATION OF GAS FROM THE COMPOSITE PART

The invention relates to a process for manufacturing a composite part as well as to a device for manufacturing such a part.

Composite materials with a polymer matrix are increasingly being used in numerous technical and industrial areas, and in particular in aeronautics, since they have excellent mechanical properties for a limited mass. They can be used to produce tooling such as for the production of structural parts.

Numerous processes exist for the preparing, moulding and polymerisation of composite parts in either small or large numbers. These processes generally involve the use of pressures higher than atmospheric pressure. Most of the processes for preparing composite parts in which one step is carried out in an autoclave also involve the use of a vacuum bag disposed around the prepared part and placed with the part in the autoclave in order to obtain a predetermined number of fibres in the part, to control the geometry of the part and to evacuate, through vents, the gasses present within the part.

The arrangement of vents in the known devices for manufacturing composite parts is very complex to model and produce. On the other hand, the arrangement of numerous vents in a single part makes the tasks carried out by the operatives in the manufacture of a composite part more onerous and renders the shaping of the composite part under pressure more difficult.

U.S. Pat. No. 3,128,322 describes a process for moulding a composite part, in which an inflatable flexible bag is progressively brought into contact with the composite part in order to permit uniform distribution of the resin and to avoid air bubbles in the part. The inflatable bag is first brought into contact with the top of a concave surface of a part and progressively displaced so that the zone of the part to which the pressure is applied extends progressively and radially in all directions from the top of the composite part.

EP 2 762 297 describes a process for manufacturing a composite part by injection of a resin under vacuum into a mould in which reinforcements in the form of fibres have been placed. The manufacturing device and process for such a part comprise a device for distribution of the resin disposed under a vacuum foil formed of a layer of deformable material, the thickness of which varies as the front of the injected resin advances so as to raise the vacuum foil and to permit better flowing of the resin. EP 2 762 297 does not describe the application of a pressure to said manufactured composite part. Furthermore, the known processes do not permit sufficiently effective evacuation of the air bubbles likely to be present within the prepared composite part. In particular, the use of a vacuum bag and/or of vents disposed in different zones of the composite part does not make it possible to ensure the evacuation of every gas bubble present in the material and which could create zones of heterogeneity and could substantially diminish the mechanical properties of the composite part thus prepared.

The invention aims to overcome these disadvantages. It aims in particular to propose a device and a process for the preparation of a composite part, making it possible to overcome the problems associated with the presence of gas bubbles in the thickness of the materials forming the composite parts.

The invention aims to propose a process and a device which are simple, reliable and without additional cost compared with the known processes and devices.

The invention also aims to propose a process which is quick to implement while being compatible with the curing times of the polymer matrixes which are likely to be used in the composite parts.

In order to do so the invention relates to a process for manufacturing a part, named composite part, formed from at least one composite material comprising at least one layer of a reinforcing structure impregnated with a polymer matrix within which the reinforcing structure extends, wherein:

a blank, named composite blank, of said composite part is prepared, said composite blank having at least one state, named non-cured state, in which the polymer matrix is at least partially non-solidified, a step of curing the polymer matrix of said composite blank is carried out, during at least part of said curing step, pressure is exerted on at least one face, named pressed face, of said composite blank, characterised in that:

said pressure is exerted in the form of a (non zero) pressure gradient, said pressure being applied to said pressed face of said composite blank between at least one first zone, named zone of maximum pressurisation, of said pressed face and at least one second zone, named gas evacuation zone, of said pressed face, said zone of maximum pressurisation being different from said gas evacuation zone and said pressure gradient being oriented towards said zone of maximum pressurisation so as to cause any gas present within the composite part to flow from said zone of maximum pressurisation to said gas evacuation zone, said pressure gradient is applied with the aid of at least one member, named pressurisation member, brought into contact with said zone of maximum pressurisation and said gas evacuation zone of said pressed face of said composite blank.

The invention relates to a device for manufacturing a composite part in accordance with a process according to the invention. The invention thus relates to a device for manufacturing a part, named composite part, formed from at least one composite material comprising at least one layer of a reinforcing structure impregnated with a matrix within which the reinforcing structure extends, said device comprising:

a blank, named composite blank, of said composite part, said composite blank having at least one state, named non-cured state, in which the polymer matrix is at least partially non-solidified, said composite blank having at least one face, named pressed face, of said composite blank, on which a pressure is exerted, characterised in that it comprises at least one member for pressurisation of said composite blank, said pressurisation member being adapted to be able to exert said pressure in the form of a pressure gradient, said pressure being applied to said pressed face of said composite blank between at least one first zone, named zone of maximum pressurisation, of said pressed face and at least one second zone, named gas evacuation zone, of said pressed face, said zone of maximum pressurisation being different from said gas evacuation zone, said pressurisation member being brought into contact with said zone of maximum pressurisation and into contact with said gas evacuation zone of said pressed face of said composite blank and said pressure gradient being oriented towards said zone of maximum pressurisation so as to cause any gas present within the composite part to flow from said zone of maximum pressurisation to said gas evacuation zone. The pressure applied in the zone of maximum pressurisation is thus higher than the pressure applied in the gas evacuation zone.

A process and a device in accordance with the invention thus make it possible to cause bubbles or gas pockets to migrate towards the outside of a composite blank so as to obtain, after curing of the polymer matrix of said composite blank, a composite part free of gas or of which the gas content within the thickness of said composite blank has at least been reduced compared with the gas content of the initial blank (prior to application of a pressure gradient in accordance with the invention). In order to do this it will thus suffice to apply to the pressed face of the composite blank a pressure which varies tangentially to this pressed face and increases in a direction from any point of the blank towards a gas evacuation zone of said blank or even from one outer edge to another outer edge of the composite blank.

The gas evacuation zone of the part can correspond, for example, to a zone of the pressed surface of the composite blank located at the edge of a border of said composite blank or of any zone of said composite blank, facing which it is possible to dispose a vent with a suction opening permitting evacuation of the gasses from the composite blank (out of a vacuum bag in which, for example, the composite blank would be disposed during shaping thereof and the step of curing the polymer matrix).

Throughout the text "non-solidified polymer matrix" is understood to be any polymer material (or any material comprising at least one polymer) not entirely polymerised (in particular in the case of a thermosetting polymer matrix) so that its final shape is not yet fixed and which is elastically deformable or, in the particular case of thermoplastic polymers, any material which is thermoplastic at a temperature higher than its glass transition temperature and/or its melting temperature (in the absence of any application of stress).

Advantageously and in accordance with the invention, said composite blank is shaped prior to said curing step and/or during said curing step of the polymer matrix of the composite blank. The shaping (for example, by moulding under pressure) of the composite blank can be carried out by application of a pressure between 0.1 MPa and 3 MPa, and in particular between 0.2 MPa and 1.2 MPa.

The composite blank can cure at ambient temperature (between 20° C. and 25° C.) or being subjected to a thermal treatment (heating). Advantageously and in accordance with the invention, a thermal treatment of said composite blank is carried out simultaneously with said curing step, during which a pressure gradient is applied to the composite blank. In particular, advantageously and in accordance with the invention, said thermal treatment makes it possible to carry out polymerisation of said polymer matrix in the case where a thermosetting matrix is used. At the end of such a polymerisation step of a thermosetting polymer matrix, said polymer matrix is thus in a cured state. In the case where heating is used to cure the composite blank, the application of pressure can start prior to or simultaneously with the heating. In order to effect said thermal treatment, the blank and the other elements of the device in accordance with the invention can be placed in an oven or the heating can be provided by at least one element (for example, a mould) which is itself a heater.

Advantageously and in accordance with the invention, the pressure gradient preferably retains the same sign and thus does not change orientation between the gas evacuation zone and the zone of maximum pressurisation. In particular, the zone of maximum pressurisation is the zone of the composite blank where the pressure applied is at a maximum and the gas evacuation zone is the zone of the composite blank where the pressure applied is at a minimum (while remaining higher than atmospheric pressure). Advantageously and in accordance with the invention, the pressure can be continuous or discontinuous. The pressure gradient can be of any form (linear, conical . . . ). In the case of a pressure gradient where the pressure varies continuously, the pressure is also monotonic (increasing). In the case of a pressure gradient where the pressure varies discontinuously, the pressure can be constant in stages between at least two points and vary monotonically between at least two other points of said pressed face.

Advantageously and in accordance with the invention, the pressure applied by said pressurisation member to the zone of maximum pressurisation is higher than the pressure applied by said pressurisation member to the gas evacuation zone.

Advantageously and in accordance with the invention, in order to apply said pressure gradient:
  a face, named pressurisation face, of at least one member, named pressurisation member, which is elastically deformable, is disposed oriented towards the pressed face of said composite blank and at a non-zero distance from the pressed face of the composite blank,
  then a face, named pressurised face, opposite to said pressurisation face, of said pressurisation member is subjected to a pressure (in particular a gas pressure), named deformation pressure, adapted to elastically deform said pressurisation member, said pressurisation member, its arrangement with respect to the pressed face and said deformation pressure being chosen so that the pressurisation face of the pressurisation member is brought into contact with said pressed face of said composite blank at least from the zone of maximum pressurisation to the gas evacuation zone and applies said pressure gradient to the pressed face. The pressurised face is subjected to a deformation pressure adapted to bring about a deformation of the pressurisation member enabling application of a pressure in the form of a pressure gradient to the composite blank. Advantageously and in accordance with the invention, prior to the application of said pressure gradient, said pressurisation member is disposed at a non-zero distance from the pressed face of the composite blank.

In particular, in certain embodiments, said pressurisation member also has an elastic deformation rigidity varying between a zone, named distal zone, of this pressurisation member coming into contact—after application of said deformation pressure—with said zone of maximum pressurisation of said pressed face, and a zone, named edging zone, of this pressurisation member coming into contact—after application of the deformation pressure—with said gas evacuation zone of said pressed face of the composite blank, the rigidity of the edging zone of said pressurisation member being greater than the rigidity of the distal zone. In particular, in some embodiments, the rigidity increases from the distal zone to the edging zone. The rigidity of the pressurisation member is understood to be the rigidity thereof in its manner of deformation opposing the application of the pressure exerted on said pressed face. More particularly, the rigidity, for example, corresponds to, or is a function of, the modulus of elasticity in traction (and/or in compression) of a portion of said pressurisation member as well as to/of the structural dimensions of the pressurisation member (thickness, . . . ). Thus said pressure gradient is at least in part obtained by a gradient of said rigidity of the pressurisation member.

In order to permit the application of the pressure gradient by reason of such a rigidity gradient, the pressurisation member can have a variable thickness and/or modulus of elasticity.

Advantageously and in accordance with the invention, at least one pressurisation member is used having, prior to application of said deformation pressure, a thickness varying between said distal zone and said edging zone, the thickness of the edging zone of said pressurisation member being greater than the thickness of the distal zone. In particular, in some embodiments, said thickness of the pressurisation member increases from the distal zone to the edging zone. Thus said pressure gradient is at least in part obtained by a gradient of said thickness prior to application of the deformation pressure.

Furthermore, as a variation or in combination, advantageously and in accordance with the invention, at least one pressurisation member is used having a modulus of elasticity at least in traction orthogonally to the direction between said distal zone and said edging zone, varying between said distal zone and said edging zone, said modulus of elasticity of the edging zone being greater than said modulus of elasticity of the distal zone. In particular, in some embodiments, said modulus of elasticity of the pressurisation member increases from the distal zone to the edging zone. Thus said pressure gradient is at least in part obtained by a gradient of said modulus of elasticity.

Furthermore, as a variation or in combination, advantageously and in accordance with the invention, the pressurisation member is disposed at a predetermined distance from the pressed face of the composite blank so that, under the effect of the deformation pressure, the pressurisation member undergoes a relative elongation ($\Delta L/L$) which varies between said distal zone and said edging zone, the relative elongation ($\Delta L/L$) facing the edging zone being greater than the relative elongation ($\Delta L/L$) facing the distal zone. In particular, in some embodiments, said relative elongation ($\Delta L/L$) of the pressurisation member increases from the distal zone to the edging zone. Thus said pressure gradient is at least in part obtained by a gradient of relative elongation ($\Delta L/L$) of the pressurisation member under the effect of said deformation pressure. This gradient of relative elongation ($\Delta L/L$) of the pressurisation member can itself be obtained by a gradient of said distance separating the pressurisation member prior to application of the deformation pressure (the elongation $\Delta L$ being an increasing function of this distance); and/or by a gradient of the initial dimensions L and/or of shape of the pressurisation member (in particular when this member is rotationally symmetrical) prior to application of the deformation pressure; and/or by a gradient of the dimensions and/or of shape of the pressed face of the blank (in particular when this blank is rotationally symmetrical).

The pressurisation member used to transmit and apply said pressure gradient to the pressed face of the composite blank can exist in various forms. It can be a panel or plate having two parallel main faces, one of these being brought into contact with the pressed face of the composite blank and the other of them being that to which a pressure is also applied so as to be able to create said pressure gradient on the pressed face of the composite blank.

Advantageously in certain embodiments of the invention, a pressurisation member is used which is rotationally symmetrical about an axis parallel to the orientation of said pressure gradient to be applied.

Furthermore, in certain embodiments, advantageously and in accordance with the invention, a bladder which can be inflated (in the manner of a balloon)—in particular an inflatable bladder which is rotationally symmetrical about an axis parallel to the orientation of said pressure gradient to be applied—is used as a pressurisation member to apply said pressure gradient to the pressed face of the composite blank.

Thus, advantageously in a process in accordance with the invention, at least one bladder adapted to be brought into contact—in an inflated state (corresponding to the inflation of the bladder by said deformation pressure)—with said pressed face of said composite blank at least between said zone of maximum pressurisation and said gas evacuation zone is used as a pressurisation member. The bladder is inflatable and has at least one inflated state used to apply said pressure to the pressed face of the composite blank, and at least one non-inflated state in which the bladder exerts no pressure on said pressed face of the composite blank. Prior to inflation or with only partial inflation, i.e. prior to application of said deformation pressure, the bladder is not in contact with the composite blank (the bladder is separated from said pressed face by said non-zero distance). During inflation, the bladder comes progressively into contact with the pressed face of the composite blank until it reaches an inflated state. Throughout the rest of the text, when it is stated that the bladder is in contact with the composite blank, this means that the bladder is thus in an inflated state (i.e. that the bladder is at least partially inflated).

Similarly, in certain embodiments, a device in accordance with the invention is also advantageously characterised in that said pressurisation member comprises at least one inflatable bladder having at least one face, named pressurisation face, adapted to be disposed, after inflation of the bladder by a pressure, named deformation pressure, in contact with the pressed face of said composite blank, and at least one face, named pressurised face, opposite to said pressurisation face.

Advantageously and in accordance with the invention, said bladder is formed of at least one material selected from the group of elastomeric materials. Said bladder is formed of at least one elastomeric material selected from the group formed of silicones, polybutadiene, polyisoprene, copolymers of styrene and of butadiene, elastomeric polyurethanes (copolymers comprising polyurethane in particular), polychloroprenes (Neoprene®), fluoroelastomers, mixtures and copolymers thereof.

Advantageously and in accordance with the invention, said pressure is applied to the pressed face using at least one bladder comprising:
 at least one internal cavity, said internal cavity comprising at least one inlet orifice for a fluid for inflation of said bladder,
 at least one flexible membrane defining each internal cavity, said bladder being adapted to be able to conform to said composite blank when the bladder is at least partially inflated and when the bladder is in contact with said composite blank. A bladder used in a device or process in accordance with the invention is thus at least formed of a flexible membrane which forms the bladder.

Any fluid, in particular any gas or any liquid, can be used to inflate the bladder. In particular, an inflation gas can be selected from the group formed of air, oxygen and inert gasses. Advantageously and in accordance with the invention, the internal cavity of said bladder is inflated using gaseous nitrogen ($N_2$ in the gaseous state).

A number of parameters linked to the use of such a bladder can be varied as desired in order to permit the application of a pressure gradient using said bladder. It is, in particular, possible to cause the relative elongation ($\Delta L/L$) of the wall of the bladder (i.e. the stretch in traction of the elastic membrane of the bladder or surface stretching) to be varied by causing the distance separating the bladder and the composite blank or the dimensions of the bladder (the size in particular) to be varied according to the shape and/or the dimensions of the blank. The distance separating the bladder and the composite blank can also be referred to as "shrinkage", and designates the distance which separates the bladder from the pressed face of the composite blank when the bladder is partially inflated while being a non-zero distance from the pressed face of the blank, i.e. the bladder is inflated with a shaping pressure for the bladder (lower than the deformation pressure of the bladder which corresponds to a state in which the bladder is in contact with the composite blank). The greater the distance between the bladder and the composite blank prior to reaching the deformation pressure, the greater will be the elongation $\Delta L$ of the elastically deformable flexible membrane, and the lower will be the pressure applied to the pressed face of the composite blank when the bladder is in contact with the blank. The pressure exerted on the pressed face of the composite blank is equal to the internal pressure of the bladder less the force of resistance to the inflation of the bladder per unit of surface area, the force of resistance to the inflation of the bladder being proportional to the relative elongation ($\Delta L/L$) of the wall of the bladder during inflation as well as to the thickness and to the Young's modulus of the bladder. At equilibrium, the force of resistance to inflation of the bladder (or stretching force) compensates for the over-pressure. Of course, it is also possible to cause the initial dimensions L of the bladder to vary, in particular the shape and size of the bladder prior to deformation in order also to influence the relative elongation ($\Delta L/L$) of the bladder until the deformation pressure is reached. In other words, selecting a bladder with a smaller diameter than a predetermined bladder makes it possible to increase $\Delta L/L$ and thus also to decrease the pressure applied to the pressed face of the composite blank. It is thus also possible to use a bladder having a diameter gradient and/or having a shape such that, in the inflated state, it permits a pressure in the form of a pressure gradient to be exerted on the composite blank, taking into account the shape and/or dimensions of the blank itself which could also itself have a non-rectilinear (neither planar nor regular) pressed face, itself causing a variation in the relative elongation. Such is the case, in particular, with a rotationally symmetrical pressed face of radial dimensions varying between said zone of maximum pressurisation and the gas evacuation zone.

Advantageously and in accordance with the invention, the bladder, being in a state inflated to a pressure lower than said deformation pressure, is disposed at a predetermined non-zero distance from the pressed face of the composite blank, said predetermined distance varying between said distal zone and said edging zone, said predetermined distance facing the edging zone being greater than the predetermined distance facing the distal zone. In particular, advantageously and in accordance with the invention said distance increases from the distal zone to the edging zone. The bladder, in a state partially inflated to a pressure lower than said deformation pressure for shaping the bladder, is disposed so that a predetermined non-zero distance separates said bladder from the pressed face of the composite blank and so as then to permit the application of a pressure gradient to said pressed face of the composite blank when the bladder is in an inflated state, at said deformation pressure of the bladder (or at a higher pressure).

Prior to application of said pressure gradient, when the inflation of the bladder has not yet started (and the bladder is in an entirely flexible form) and when the bladder is partially inflated (i.e. at the shaping pressure of the bladder lower than the deformation pressure) and has a predetermined shape while still being able to be deformed (inflated), the bladder is not disposed in contact with the composite blank. Preferably, when the pressure in the bladder is lower than said shaping pressure of the bladder and when the pressure in the bladder is equal to said shaping pressure of the bladder, the bladder has no zone of contact with said composite blank.

Thus, by the choice of the bladder (according to its diameter in particular) and of the distance at which the composite blank is placed prior to application of said deformation pressure of the bladder it is possible to cause the pressure then applied (after inflation to said deformation pressure) to the pressed face of the composite blank to be varied and to obtain said pressure gradient. Said distance having to be provided between the bladder and the composite blank prior to application of said deformation pressure can be determined by calculation by finite elements or even experimentally, preferably so as to avoid the formation of pressure pockets within the blank, in order to obtain said gradient of the relative elongation $\Delta L/L$.

Furthermore, a dynamic effect is obtained during the inflation of the bladder to said deformation pressure of the bladder, the bladder not initially being in contact with the composite blank and coming progressively into contact with the composite blank during its inflation, from said distal zone to said edging zone until reaching the deformation pressure. With such a bladder, in these embodiments, said pressure gradient thus comprises at least one dynamic variation in pressure applied during inflation of the bladder (during displacement of the flexible membrane of the bladder during the inflation thereof) permitting the displacement and the evacuation of at least part of the gas present within the composite blank. Such a dynamic variation in pressure also has the advantage of making it possible to drive out the air located between the composite blank and the bladder during inflation of the bladder and when the bladder sweeps the pressed face of the composite blank during this inflation. This dynamic variation in pressure is preferably followed by maintenance of said (static) pressure gradient once the bladder is inflated and the system comprising the blank and the bladder is at equilibrium.

As a variation or in combination with the variable distance between the bladder and the composite blank prior to inflation of the bladder by said deformation pressure but also as a variation or in combination with the use of a bladder of variable diameter, it is possible to use a bladder having a flexible membrane which is of variable thickness and/or variable modulus of elasticity.

Advantageously and in an embodiment variation of a process and of a device in accordance with the invention, at least one flexible membrane is used having a varying thickness between said distal zone of said bladder and said edging zone of said bladder, said thickness of the edging zone of the flexible membrane of the bladder being greater than said thickness of the distal zone of the flexible membrane of the bladder.

As a variation or in combination, advantageously and in accordance with the invention, at least one flexible membrane is used having a modulus of elasticity varying between said distal zone of said bladder and said edging zone of said bladder, said modulus of elasticity of the edging zone of the flexible membrane of the bladder being greater than the modulus of elasticity of the distal zone of the flexible membrane of the bladder.

In order to cause the modulus of elasticity of the flexible membrane of the bladder to be varied it is possible to juxtapose zones formed of different elastomeric materials, each elastomer having a different modulus of elasticity. This modulus of elasticity can also be modified using a single elastomer as a matrix and adding thereto mineral or metallic fillers in the form of fibres, particles (powders), threads . . . or even carbon fibres (or nanotubes or other forms).

In certain embodiments, in an advantageous manner, a device in accordance with the invention further comprises a pressurisation support adapted to keep said composite blank in position with respect to the pressurisation support and to the pressurisation member, in particular a bladder in the inflated state, when said pressurisation member is disposed in contact with said composite blank. The pressurisation support can also constitute a mould for the shaping of the composite blank.

The composite blank is formed of at least one composite material comprising at least one layer of a reinforcing structure. The reinforcing structure is impregnated with a polymer matrix within which the reinforcing structure extends. The composite blank (and the final composite part obtained) can be of any shape and any size. The composite blank can thus be of a parallelepiped, spherical, hemispherical, cylindrical or even conical shape or any other irregular shape which could be manufactured. The composite blank can also be at least partially hollow and have an internal space.

The reinforcing structure can be of any type. In particular, advantageously and in accordance with the invention, said reinforcing structure is selected from the group formed of monofilaments, cables, bundles, fabrics, tapes, cloths, mats and sheets.

Advantageously and in accordance with the invention, said reinforcing structure comprises at least one reinforcing layer and each reinforcing layer is selected from the group formed by cloths of synthetic woven fibres, cloths of non-woven synthetic fibres, mats, cloths of woven synthetic tapes, cloths of non-woven synthetic tapes, sheets of synthetic materials, sheets of metallic materials, multi-layer complexes comprising a plurality of layers superimposed on one another, each layer being made of one of these materials.

In particular, advantageously and in accordance with the invention, said composite part is formed of plies, named pre-impregnated plies, of woven reinforcements impregnated with polymer resin and superimposed one above the other. Alternatively and in accordance with the invention, said composite part can be prepared by manual impregnation (using a brush, . . . ) of the reinforcing structure with a polymer resin.

Advantageously and in accordance with the invention, said polymer matrix is selected from the group of thermosetting resins, thermoplastic resins and mixtures thereof.

Throughout the text, "resin" is understood to be any at least partially liquid composition able to be cured (irreversibly or possible reversibly in the case of a thermoplastic resin).

Advantageously and in accordance with the invention, said polymer matrix of the composite blank is selected from thermoplastic resins, thermosetting resins and mixtures thereof. The thermoplastic resins and thermosetting resins may or may not comprise precursors of said thermoplastic polymers or precursors of said thermosetting polymers. "Precursors" of the thermoplastic or thermosetting polymers are understood to be any monomer of at least one thermoplastic or thermosetting polymer accompanied, as appropriate, by any catalyst or curing agent necessary for the polymerisation or curing of the resin. "Thermoplastic resins" and "thermosetting resins" are understood to be any composition comprising at least molecules which are at least partially polymerised of any thermoplastic or thermosetting material respectively. A thermoplastic resin or a thermosetting resin does not solely designate compositions which are already totally polymerised but also compositions which may comprise (non-polymerised) molecules of monomers.

Advantageously and in accordance with the invention, in the case where the polymer matrix is selected from thermosetting resins, the pressure is applied in contact with the composite part during at least part of a polymerisation (and simultaneous or non-simultaneous shaping) step of said thermosetting resin.

In one embodiment variation of a process and of a device in accordance with the invention, said composite blank is hollow and has at least one internal space into which the bladder is introduced. There is thus no need to use a pressurisation support, the composite blank itself functioning as a pressurisation support.

The invention also relates to a process and a device which are characterised in combination by all or some of the features mentioned above or below.

Other aims, features and advantages of the invention will become apparent upon reading the following description of one of its preferential embodiments given by way of non-limiting example and with reference to the attached figures in which:

FIGS. 1 to 4 illustrate different steps of shaping and curing of the polymer resin forming the matrix impregnating a reinforcing structure of the composite blank 1.

FIGS. 1 to 4 illustrate a composite blank 1 comprising a plurality of layers superimposed one on another, each layer of the composite blank 1 being formed of a reinforcing structure impregnated with a matrix comprising at least one polymer resin. The composite blank 1 has a parallelepiped shape and comprises two free main faces, including one face, named upper face 2, and one face, named lower face 3, opposite to said upper face. The composite blank 1 also has a gas evacuation zone 4 comprising at least one border of said composite blank 1. The composite blank 1 is, for example, formed of an epoxy resin and of mats of carbon fibres superimposed one on another in parallel with said pressed face. The pressure is exerted on the composite blank in a direction normal to the longitudinal direction of said mats of fibres.

Figure 1:
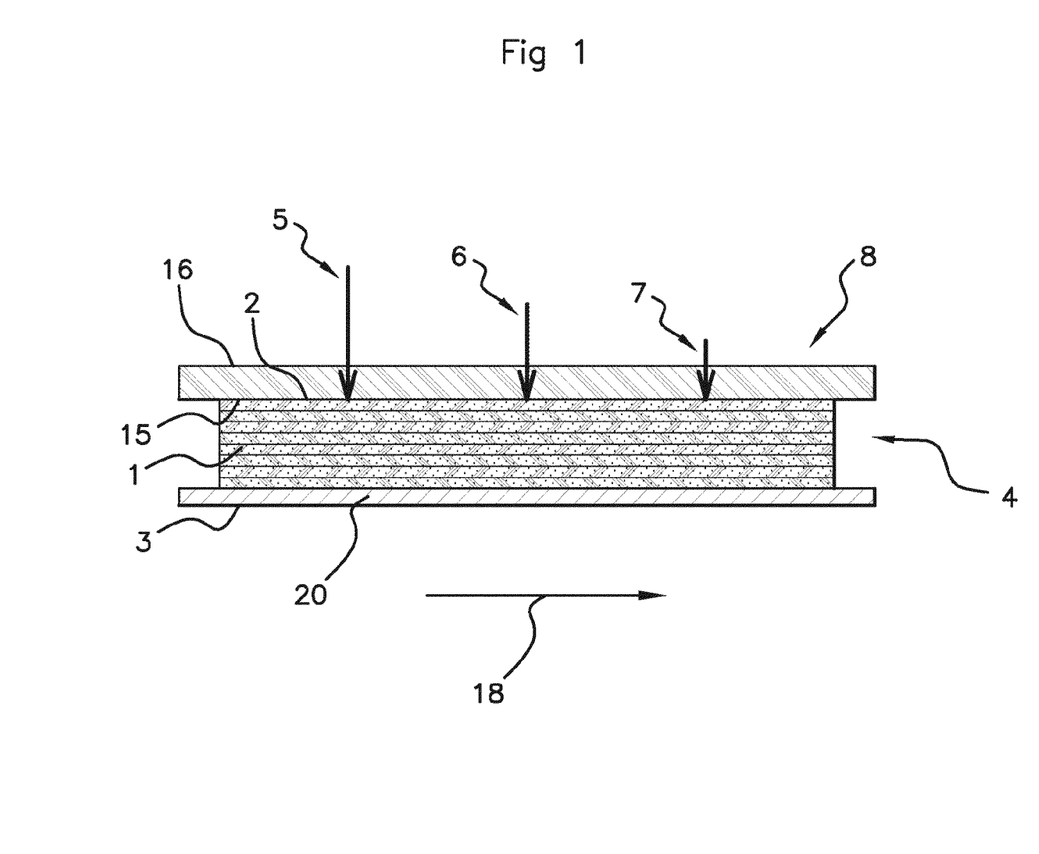
FIG. 1 is schematic, longitudinal cross-sectional view of a device in accordance with the invention, comprising a pressurisation member.

The device in accordance with the invention illustrated in FIG. 1 comprises a composite blank 1, a pressurisation member 8 and a pressurisation support 20 adapted to keep said composite blank in position when a pressure is applied to the composite blank 1. The pressurisation member 8 has a pressurisation face 15 in contact with the pressed face 2 of said composite blank, and a pressurised face 16 opposite said pressurisation face 15, the pressurisation member being elastically deformable. The pressurisation member 8 illustrated in FIG. 1 is formed of a single material and has a block shape, of which the thickness (shortest distance between the pressurisation face 15 and the pressurised face 16) is constant.

In particular, the pressurised face 16 is subjected to a constant pressure such as a gas pressure, and said pressurisation member also has an elastic deformation rigidity varying between said zone of maximum pressurisation of said pressed face and said gas evacuation zone of said pressed face of the composite blank, i.e. a rigidity gradient between said zone of maximum pressurisation of said pressed face and said gas evacuation zone of said pressed face of the composite blank. In the illustrated example where the thickness of the pressurisation member is constant, this rigidity gradient is obtained by a modulus of elasticity gradient between said zone of maximum pressurisation of said pressed face and said gas evacuation zone of said pressed face of the composite blank.

The pressurisation support 20 can also act as a mould permitting a desired shape to be imparted to the composite blank 1. A step of curing the polymer matrix of the composite blank 1 thus also consists of a step of compression moulding. The pressurisation member 8 makes it possible to apply a pressure gradient illustrated by the arrows 5, 6 and 7 and to cause flowing and evacuation of the gas which may be present in the blank 1 in the evacuation direction 18. The pressure 5 is greater than the pressure 6 which is itself greater than the pressure 7 applied to the zone closest to the gas evacuation zone 4 of the composite blank 1.

Figure 2A:
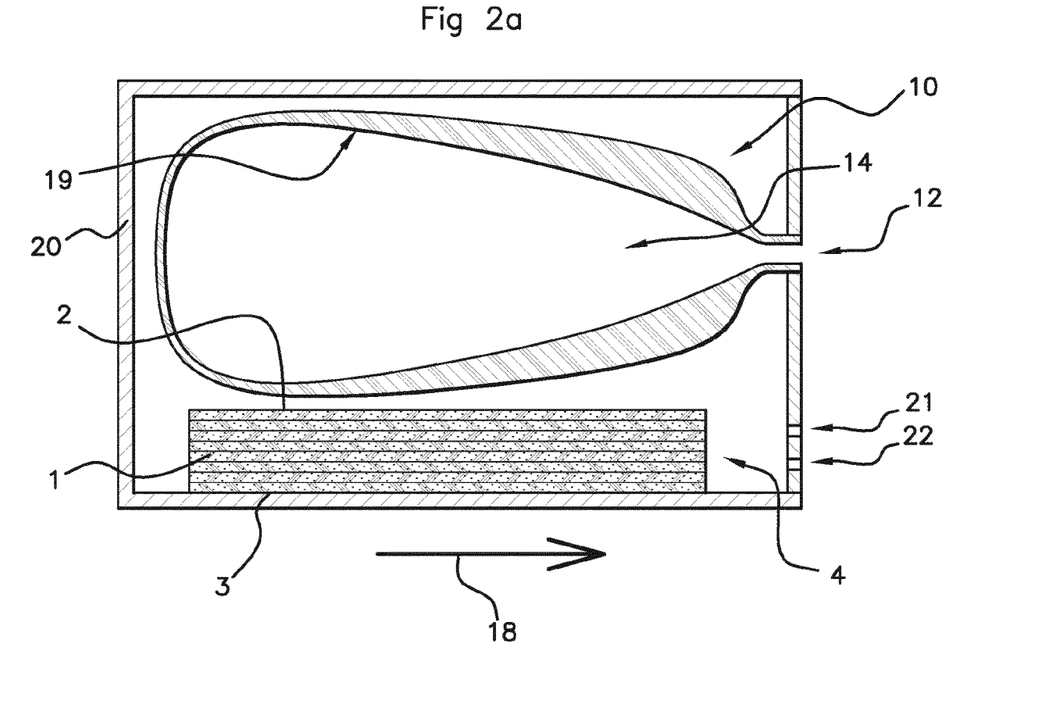
FIG. 2a is a schematic, longitudinal cross-sectional view of a device in accordance with the invention, in which an inflatable bladder of variable thickness is used as a pressurisation member, said bladder being in a partially inflated state.
Figure 2B:
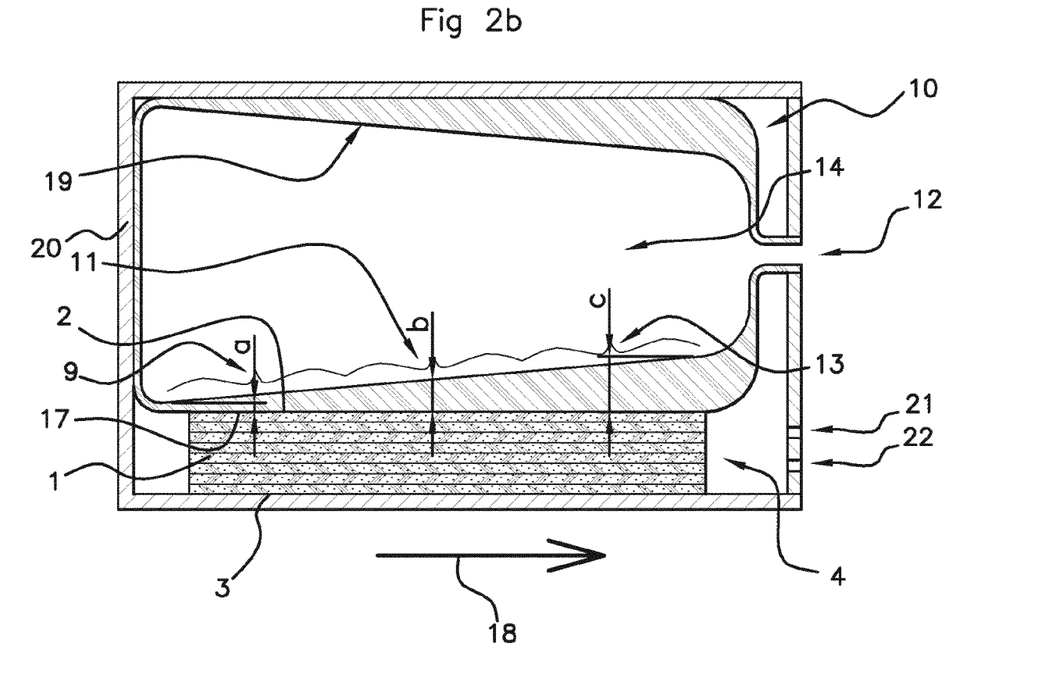
FIG. 2b is a schematic, longitudinal cross-sectional view of a device in accordance with the invention, in which an inflatable bladder of variable thickness is used as a pressurisation member, said bladder being in an inflated state.

In the embodiments illustrated in FIGS. 2a, 2b, 3a and 3b, the device in accordance with the invention comprises a device for pressurising the composite blank 1 consisting of an inflatable bladder 10 in the form of a balloon comprising a peripheral membrane of flexible material. The bladder 10 comprises an internal cavity 14 comprising an orifice 12 for inlet of a gas for inflation of said bladder. Prior to inflation (step not illustrated), the bladder is in a flexible form in the manner of a fabric of a greater or lesser degree of flexibility and the bladder does not have a predetermined shape. When the bladder is partially inflated (FIG. 2a), the bladder is shaped (rotationally symmetrical about an axis passing via the orifice 12 and corresponding to the orientation of the pressure gradient to be applied to the composite blank 1) and is not in contact with the composite blank 1 nor with a pressurisation support 20. After additional inflation to a pressure, named deformation pressure, as shown in FIG. 2b, the inflatable bladder 10 has an external pressurisation face 17 brought into contact with the pressed face 2 of the composite blank 1, and an internal pressurised face 19 defining the internal cavity 14, this pressurised face 19 being opposite to said pressurisation face. Once inflated, the gas pressure inside the inflatable bladder 10 being applied to the pressurised face of the bladder is greater than the pressure prevailing about and outside the bladder (outside the internal cavity 14).

Figure 3A:
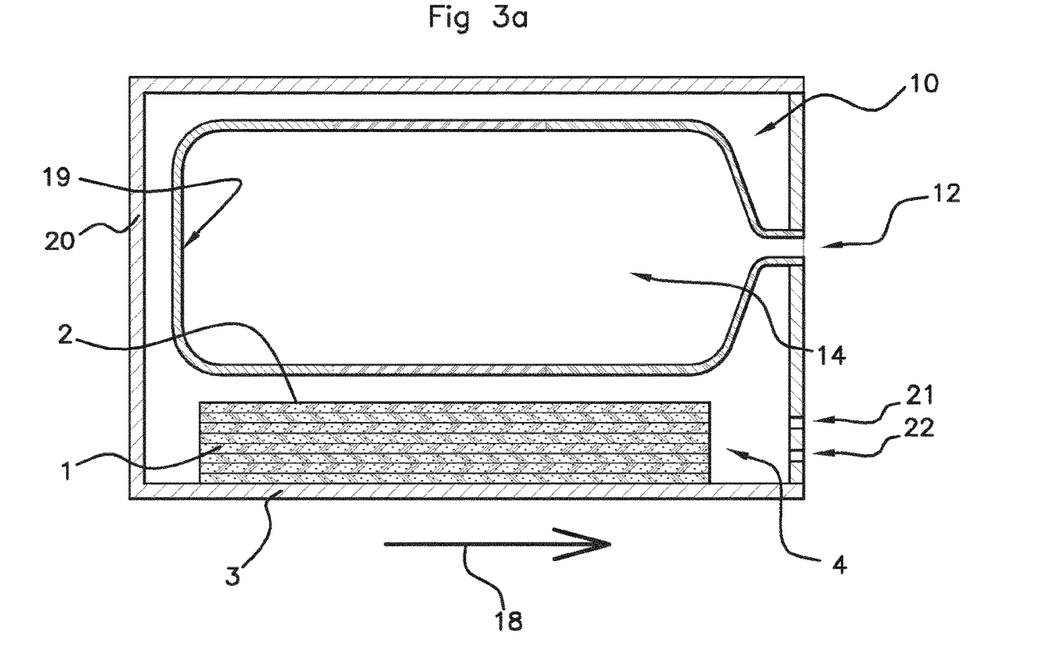
FIG. 3a is a schematic, longitudinal cross-sectional view of a device in accordance with the invention, in which an inflatable bladder of variable modulus of elasticity is used as a pressurisation member, said bladder being in a partially inflated state.
Figure 3B:
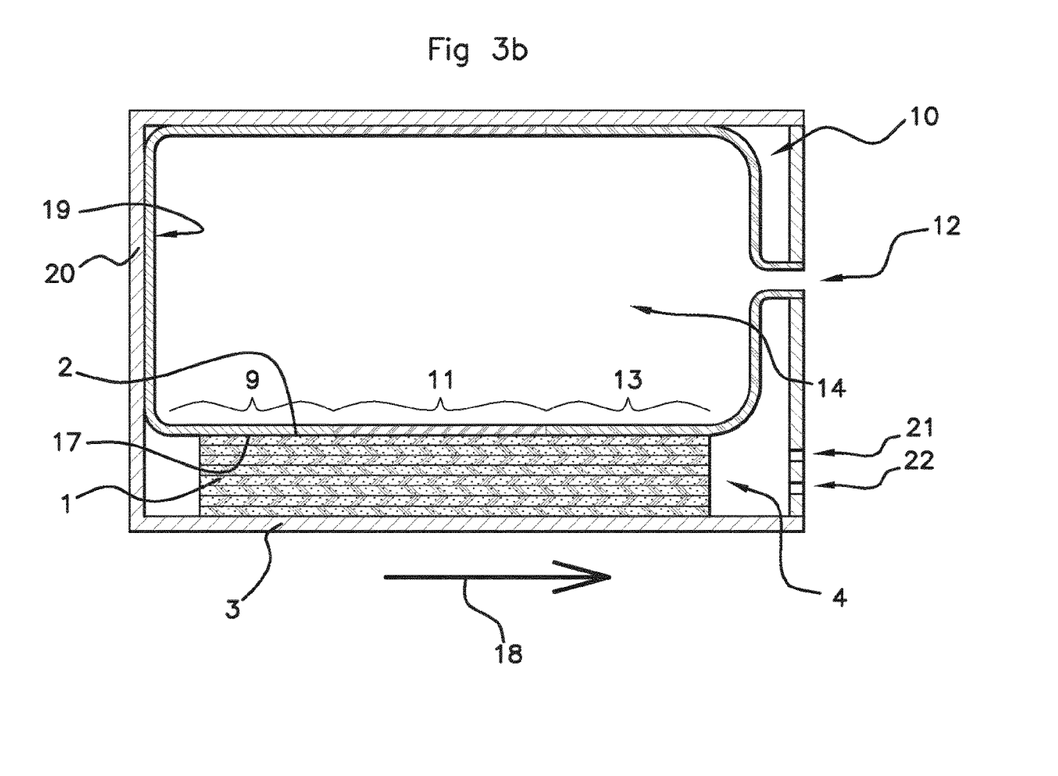
FIG. 3b is a schematic, longitudinal cross-sectional view of a device in accordance with the invention, in which an inflatable bladder of variable modulus of elasticity is used as a pressurisation member, said bladder being in a inflated state.

The devices illustrated in FIGS. 2 and 3 also comprise the hollow pressurisation support 20 adapted to keep said composite blank in position when the bladder 10 compresses the composite blank 1, the bladder 10 and the composite blank 1 thus being disposed inside said pressurisation support 20. The pressurisation support 20 used in the embodiments illustrated in FIGS. 2a to 3b is in the form of a hollow generally parallelepiped mould, of which one of the sides has an opening permitting the provision of a passage for the orifice 12 for inlet of gas for inflation of said bladder, as well as vents 21 and 22 via which the gasses evacuated by the gas evacuation zone 4 of the composite blank 1 can escape.

In the embodiment of a device in accordance with the invention illustrated in FIGS. 2a and 2b, the peripheral membrane of said bladder has a gradient of thickness a, b, c (thicknesses increasing from a to c). As shown in FIG. 2b, the thickness varies in a continuous manner, increasing between a zone, named distal zone 9 (in the proximity of the portion of thickness a of said bladder) and a zone, named edging zone 13 of the bladder (in the proximity of the thickness portion c). The edging zone 13 faces the gas evacuation zone 4 of the pressed face 2 of the composite blank 1. The distal zone 9 faces the zone of maximum pressurisation of the pressed face 2. The thickness of the edging zone 13 of the bladder 10 is greater than the thickness of the distal zone 9 of the bladder 10.

In the embodiment of a device in accordance with the invention illustrated in FIGS. 2a and 2b, a median zone 11 of the bladder having a thickness b located between the distal zone 9 and the edging zone 13 of the bladder 10 is thus such that a<b<c (the value of the thickness a is less than the value of the thickness b which is itself less than the value of thickness c). In this way, a continuous pressure gradient is applied to the pressed face 2 of the composite blank 1 permitting flowing and evacuation of the gasses (gas bubbles . . . ) in an evacuation direction 18. This pressure gradient may or may not be constant (affine variation of the pressure along the blank).

The application of the pressure to the pressed face during inflation of the bladder comprises a first dynamic phase during the inflation of the bladder 10, the non-inflated bladder not initially being in contact with the composite blank 1 and coming progressively into contact with the composite blank 1 during inflation thereof, until an inflated state is reached, at least at the deformation pressure. Then, once the bladder is inflated and the system is at equilibrium, said pressure gradient is maintained in order to prolong and finalise the evacuation of the gasses present within the composite blank 1. However, in some cases, the dynamic pressure variation which results from the exertion of a pressure gradient by the bladder, can be sufficient for the evacuation of the gasses and not necessitate additional maintenance of the pressure.

Causing the inflated bladder 10 to be brought into contact with said composite part by applying pressure thereto permits evacuation of the gasses present within the thickness of the composite blank 1 in the direction 18 of evacuation of the gasses as far as the gas evacuation zone 4 of the composite blank 1. Bringing the inflated bladder 10 into contact with said composite part by applying a pressure thereto also makes it possible to control the geometry of the part and to control the level of fibres in the part, of the resin (liquid polymer matrix) also being able to be evacuated at the evacuation zone 4.

In the embodiment of a device in accordance with the invention illustrated in FIGS. 3*a* and 3*b*, the external membrane of said bladder has a modulus of elasticity varying in different zones of the membrane of the bladder 10, i.e. a modulus of elasticity gradient. As shown in FIG. 3*b*, a zone, named distal zone 9, of said bladder 10 has a first modulus of elasticity $E_1$. A zone, named median zone 11, of the bladder has a second modulus of elasticity $E_2$, $E_2$ being greater than $E_1$. A third zone, named edging zone 13, of the bladder has a modulus of elasticity $E_3$, $E_3$ being greater than $E_2$. The median zone 11 is thus disposed between the distal zone 9 and the edging zone 13 of the bladder 9. The edging zone 13 faces a zone of the composite blank closer to the gas evacuation zone 4 of the pressed face 2 of the composite blank 1 than the zone of the pressed face of the composite blank 1 facing which the distal zone is disposed. The distal zone 9 faces a zone of the composite blank closer to the zone of maximum pressurisation of the pressed face 2 than the zone of the pressed face 2 of the composite blank 1 facing which the edging zone 13 is disposed. In this way, and taking into account the relative values of the moduli of elasticity of these three distinct zones, the same pressure prevailing within the bladder, a discontinuous pressure gradient is applied to the pressed face 2 of the composite blank 1 permitting flowing and evacuation of the gasses in the evacuation direction 18. Such a pressure gradient makes it possible to cause the gasses present within the thickness of the composite blank 1 to flow from the end of the composite blank which is disposed in contact with the distal zone 9 of the bladder to the gas evacuation zone 4 of the composite blank 1.

As in the embodiment of FIGS. 2*a* and 2*b*, the application of the pressure according to this pressure gradient to said pressed face comprises a first dynamic phase during inflation of the bladder 10. Then, once the bladder is inflated, from the deformation pressure, the pressure gradient may or may not be maintained.

The internal pressure (deformation pressure) within the bladder is, for example, between 0.2 MPa and 1.2 MPa.

The composite blank can cure at ambient temperature (between 20° C. and 25° C.) or being subjected to a thermal treatment (heating) simultaneously with the application of the pressure gradient. The composite blank, the bladder and the pressurisation support 20 can be placed in an oven or the heating can be provided by a pressurisation medium which is itself, for example, a heating medium.

The period during which the gasses are evacuated form the composite blank can be, for example, between 30 min and 45 min.

Figure 4:
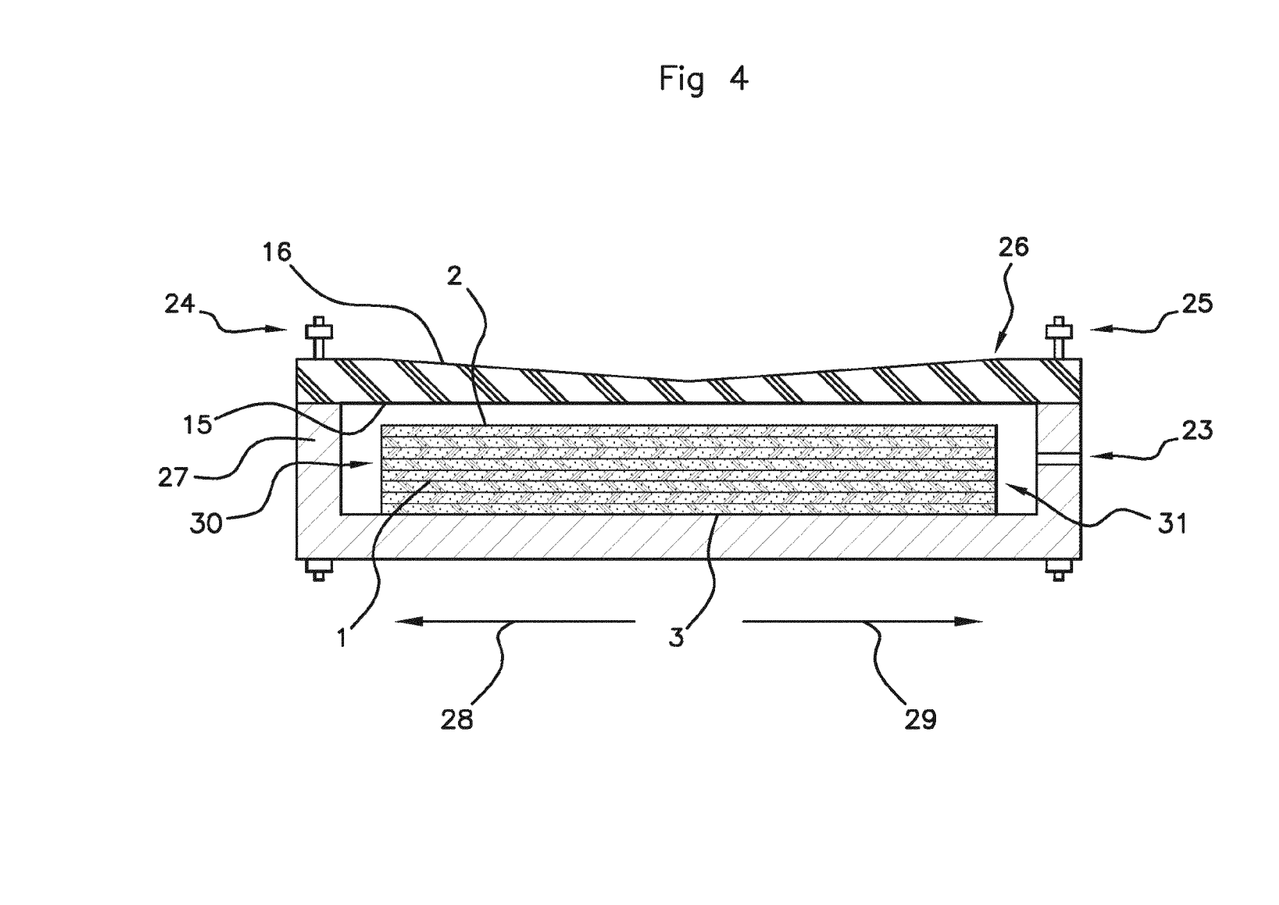
FIG. 4 is schematic, longitudinal cross-sectional view of a device in accordance with the invention, comprising a pressurisation member.

In another embodiment of a device in accordance with the invention illustrated in FIG. 4, the device comprises a composite blank 1, a pressurisation member 26 and a pressurisation support 27 adapted to keep said composite blank in position when a pressure is applied to the composite blank 1. This device is disposed in an autoclave (not illustrated) in which a pressure greater than atmospheric pressure prevails, adapted to permit the creation of a pressure gradient by virtue of the contact of the pressurisation member 26 with the pressed face 2 of said composite blank. The step illustrated in FIG. 4 shows the device prior to application of the pressure in the autoclave, the pressurisation member 26 not yet being in contact with the composite blank, the pressurisation member 26 being disposed at a predetermined distance from the composite blank before the pressure within the autoclave is increased. The pressurisation member 26 has a pressurisation face 15 adapted to come into contact with the pressed face 2 of said composite blank when the device is subjected to the pressure prevailing within the autoclave, and a pressurised face 16 opposite said pressurisation face 15, the pressurisation member being elastically deformable. The pressurisation member 26 illustrated in FIG. 4 is formed of a single material and has a block shape of which the thickness (shortest distance between the pressurisation face 15 and the pressurised face 16) is less at its centre. Since the pressurisation member 26 has a variable thickness, it makes it possible to apply a pressure gradient, whereas the pressure applied to its pressurised face 16 is constant and corresponds to the pressure prevailing within the autoclave. Bolts and nuts 24, 25 make it possible to fix the pressurisation member 26 to the pressurisation support 27. A vent 23 formed in the thickness of the pressurisation support 27 makes it possible to connect the device to a source of suction (vacuum). This device makes it possible to cause flowing and evacuation of the gas which may be present in the blank 1 in the evacuation direction 28 and 29 from the centre of the composite blank to the ends 30 and 31 of the composite blank, thus each forming a gas evacuation zone.

In another embodiment of a device in accordance with the invention (not illustrated), it is possible to cause the relative elongation ($\Delta L/L$) of the wall of the bladder (i.e. the stretch of the wall of the bladder or surface stretching) to be varied, in particular by causing the distance separating the bladder and the composite blank and/or the dimensions and/or the shape of the bladder to be varied, taking account of the shape and the dimensions of the composite blank. The distance separating the bladder and the composite blank designates the distance which separates the bladder from the pressed face of the composite blank when the bladder is in a partially inflated state, prior to inflation to the deformation pressure.

The greater—locally—the distance between the bladder and the composite blank prior to inflation, the lower—locally—will be the pressure applied to the pressed face of the composite blank. The pressure exerted on the pressed face of the composite blank is equal to the internal pressure of the bladder less the force of resistance to the inflation of the bladder per unit of surface area, the force of resistance to the inflation of the bladder being proportional to the relative elongation ($\Delta L/L$) of the wall of the bladder during inflation as well as to the thickness and the Young's modulus of the bladder. It is also possible to cause variation of the dimensions of the bladder, in particular the shape and size of the bladder, in order also to influence this shrinkage prior to inflation.

Furthermore, in order to create said pressure gradient it is possible to choose a bladder formed of a material which is rigid in a direction (for example, the axial direction (or longitudinal direction) which corresponds to the direction of the pressure gradient). For example, carbon or glass fibres or fibres known under the name of Kevlar® are placed in the material forming the wall of the bladder in the axial direction. During inflation, the rigidity will thus vary in the circumferential direction of the bladder. The material forming the bladder can thus be anisotropic.

In another embodiment of a device in accordance with the invention (not illustrated), the bladder can comprise a plurality of internal cavities (for example, three internal cavities), the pressure being different in each of said cavities in order to exert a discontinuous pressure gradient on the pressed face of the composite blank.

The invention can comprise a large number of embodiment variants. In particular, it is possible to prepare any type of composite part, even the most complex, using, if necessary, a bladder specially designed and adapted to the geometry of said composite part. The composite blank can be of any shape, for example, a disc, a crown, a strip or even be in the form of a convoluted part.

Furthermore, one or a plurality of bladders can be used simultaneously to prepare a single composite part. And each bladder can have, in combination, a discontinuous thickness and/or a discontinuous modulus of elasticity and/or a plurality of internal cavities. The peripheral membrane of the bladder used as a pressurisation member in a device or process in accordance with the invention can have, for example, five zones of different moduli of elasticity and each of these five zones can have a continuously varying thickness. Such an embodiment has the advantage of allowing a significant pressure gradient to be achieved while exerting a pressure which increases in the most regular manner possible, without sudden increase of pressure between each zone having a different modulus of elasticity. On the other hand, each zone of the membrane of the same thickness and/or having the same modulus of elasticity can have variable dimensions (identical or different from each other) depending on the pressure to be applied, the type of part, the materials forming the blank.

The invention claimed is:

1. A process for manufacturing a part, named composite part, formed from at least one composite material comprising at least one layer of a reinforcing structure impregnated with a polymer matrix within which the reinforcing structure extends, wherein:
    a blank, named composite blank, of said composite part is prepared, said composite blank having at least one state, named non-cured state, in which the polymer matrix is at least partially non-solidified,
    a step of curing the polymer matrix of said composite blank is carried out,
    during at least part of said curing step, pressure is exerted on at least one face, named pressed face, of said composite blank,
wherein:
    said pressure is exerted in the form of a pressure gradient, said pressure being applied to said pressed face of said composite blank between at least one first zone, named zone of maximum pressurisation, of said pressed face and at least one second zone, named gas evacuation zone, of said pressed face, said zone of maximum pressurisation being different from said gas evacuation zone and said pressure gradient being oriented towards said zone of maximum pressurisation so as to cause any gas present within the composite blank to flow from said zone of maximum pressurisation to said gas evacuation zone,
    said pressure gradient is applied with the aid of at least one member, named pressurisation member, brought into contact with said zone of maximum pressurisation and into contact with said gas evacuation zone of said pressed face of said composite blank,
    said at least one pressurisation member is used having an elastic deformation rigidity varying between a zone, named distal zone, of said at least one pressurisation member coming into contact—after application of a pressure, named deformation pressure—with said zone of maximum pressurisation of said pressed face, and a zone, named edging zone, of said at least one pressurisation member coming into contact—after application of said deformation pressure—with said gas evacuation zone of said pressed face of the composite blank, the rigidity of said edging zone of said at least one pressurisation member being greater than the rigidity of said distal zone.

2. The process according to claim 1, wherein in order to apply said pressure gradient:
    a face, named pressurisation face, of said at least one pressurisation member, which is elastically deformable, is disposed oriented towards the pressed face of said composite blank and at a non-zero distance from the pressed face of the composite blank,
    then a face, named pressurised face, opposite to said pressurisation face, of said at least one pressurisation member is subjected to said deformation pressure, adapted to elastically deform said pressurisation member, the arrangement of said pressurization member with respect to the pressed face and said deformation pressure being chosen so that the pressurisation face of said at least one pressurisation member is brought into contact with said pressed face of said composite blank at least between the zone of maximum pressurisation and the gas evacuation zone and applies said pressure gradient to the pressed face.

3. The process according to claim 2, wherein said at least one pressurisation member is used having, prior to application of said deformation pressure, a thickness varying between said distal zone and said edging zone, the thickness of said edging zone of said at least one pressurisation member being greater than the thickness of said distal zone.

4. The process according to claim 3, wherein said at least one pressurisation member is used having a modulus of elasticity at least in traction orthogonally to the direction between said distal zone and said edging zone, varying between said distal zone and said edging zone, said modulus of elasticity of said edging zone being greater than said modulus of elasticity of the distal zone.

5. The process according to claim 3, wherein said at least one pressurisation member is disposed at a predetermined distance from the pressed face of the composite blank such that, under said effect of the deformation pressure, the relative elongation ($\Delta L/L$) of said at least one pressurisation member varies between a zone, named distal zone, of said at least one pressurisation member coming into contact—after application of said deformation pressure—with said zone of maximum pressurisation of said pressed face, and said edging zone, of said at least one pressurisation member coming into contact—after application of said deformation pressure—with said gas evacuation zone of said pressed face of the composite blank, the relative elongation ($\Delta L/L$) facing the edging zone being greater than the relative elongation ($\Delta L/L$) facing the distal zone.

6. The process according to claim 2, wherein said at least one pressurisation member is used having a modulus of elasticity at least in traction orthogonally to the direction between said distal zone and said edging zone, varying between said distal zone and said edging zone, said modulus of elasticity of said edging zone being greater than said modulus of elasticity of the distal zone.

7. The process according to claim 2, wherein said at least one the pressurisation member is disposed at a predetermined distance from the pressed face of the composite blank such that, under the effect of said deformation pressure, the relative elongation ($\Delta L/L$) of said at least one pressurisation member varies between a zone, named distal zone, of said at least one pressurisation member coming into contact—after application of said deformation pressure—with said zone of maximum pressurisation of said pressed face, and said edging zone, of said at least one pressurisation member coming into contact—after application of said deformation pressure—with said gas evacuation zone of said pressed face of the composite blank, the relative elongation ($\Delta L/L$) facing said edging zone being greater than the relative elongation ($\Delta L/L$) facing the distal zone.

8. The process according to claim 2, wherein the at least one bladder adapted to be brought into contact—in an inflated state—with said pressed face of said composite blank at least between said zone of maximum pressurisation and said gas evacuation zone is used as said at least one pressurisation member.

9. The process according to claim 1, wherein said at least one pressurisation member is used having a modulus of elasticity at least in traction orthogonally to the direction between said distal zone and said edging zone, varying between said distal zone and said edging zone, said modulus of elasticity of said edging zone being greater than said modulus of elasticity of said distal zone.

10. The process according to claim 9, wherein said at least one pressurisation member is disposed at a predetermined distance from the pressed face of the composite blank such that, under the effect of said deformation pressure, the relative elongation ($\Delta L/L$) of said at least one pressurisation member varies between a zone, named distal zone, of said at least one pressurisation member coming into contact—after application of said deformation pressure—with said zone of maximum pressurisation of said pressed face, and a zone, named edging zone, of said at least one pressurisation member coming into contact—after application of said deformation pressure—with said gas evacuation zone of said pressed face of the composite blank, the relative elongation ($\Delta L/L$) facing the edging zone being greater than the relative elongation ($\Delta L/L$) facing the distal zone.

11. The process according to claim 1, wherein said at least one pressurisation member is disposed at a predetermined distance from the pressed face of the composite blank such that, under the effect of said deformation pressure, the relative elongation ($\Delta L/L$) of said at least one pressurisation member varies between said distal zone, of said at least one pressurisation member coming into contact—after application of said deformation pressure—with said zone of maximum pressurisation of said pressed face, and said edging zone, of said at least one pressurisation member coming into contact—after application of said deformation pressure—with said gas evacuation zone of said pressed face of the composite blank, the relative elongation ($\Delta L/L$) facing said edging zone being greater than the relative elongation ($\Delta L/L$) facing the distal zone.

12. The process according to claim 1, wherein at least one bladder adapted to be brought into contact—in an inflated state—with said pressed face of said composite blank at least between said zone of maximum pressurisation and said gas evacuation zone is used as said at least one pressurisation member.

13. The process according to claim 12, wherein said pressure is applied to the pressed face using the at least one bladder comprising:
- at least one internal cavity, said internal cavity comprising at least one inlet orifice for a fluid for inflation of the at least one bladder,
- at least one flexible membrane, said bladder being adapted to be able to conform to said composite blank when the at least one bladder is in contact with said composite blank.

14. The process according to claim 12, wherein the at least one bladder, being in a state inflated to a pressure lower than said deformation pressure, is disposed at a predetermined distance from the pressed face of the composite blank, said predetermined distance varying between said distal zone and said edging zone, said predetermined distance facing said edging zone being greater than the predetermined distance facing the distal zone.

15. The process according to claim 12, wherein the at least one bladder is inflated with the aid of gaseous nitrogen.

16. The process according to claim 1, wherein a thermal treatment of said composite blank is carried out simultaneously with said curing step.

\* \* \* \* \*